United States Patent
Campbell

(10) Patent No.: US 6,549,533 B1
(45) Date of Patent: Apr. 15, 2003

(54) MANAGING SWITCHED VIRTUAL CIRCUITS IN A NETWORK

(75) Inventor: Walter Blanton Campbell, Granite Bay, CA (US)

(73) Assignee: Objective Systems Integrators, Folsom, CA (US)

( * ) Notice: Subject to any disclaimer, the term of this patent is extended or adjusted under 35 U.S.C. 154(b) by 0 days.

(21) Appl. No.: 09/224,567

(22) Filed: Dec. 30, 1998

(51) Int. Cl.[7] .............................. H04L 12/26; H04J 3/14; G08C 15/00; G06F 11/00; G01R 31/08
(52) U.S. Cl. .................. 370/351; 370/232; 370/395; 370/410; 709/236; 709/238
(58) Field of Search ................................ 370/351, 218, 370/237, 393, 397, 410, 471, 474, 409; 379/220, 221, 901; 395/200.68, 200.69, 200.2, 200.11

(56) References Cited

U.S. PATENT DOCUMENTS

| | | | | |
|---|---|---|---|---|
| 5,014,262 A | * | 5/1991 | Harshavardhana | 370/16 |
| 5,016,243 A | * | 5/1991 | Fite, Jr. | 370/16 |
| 5,023,780 A | * | 6/1991 | Brearley | 364/200 |
| 5,048,087 A | * | 9/1991 | Trbovich et al. | 380/43 |
| 5,303,237 A | | 4/1994 | Bergman et al. | 370/85.6 |
| 5,392,402 A | * | 2/1995 | Robrock, II | 395/200 |
| 5,416,771 A | * | 5/1995 | Iwata | 370/410 |
| 5,438,570 A | | 8/1995 | Karras et al. | 370/94.2 |
| 5,490,141 A | * | 2/1996 | Lai et al. | 370/352 |
| 5,539,884 A | | 7/1996 | Robrock, II | 395/200.12 |
| 5,579,480 A | * | 11/1996 | Cidon et al. | 395/200.1 |
| 5,592,530 A | | 1/1997 | Brockman et al. | 379/34 |
| 5,638,359 A | * | 6/1997 | Peltola et al. | 370/229 |
| 5,675,578 A | | 10/1997 | Gruber et al. | 370/248 |
| 5,712,908 A | | 1/1998 | Peltola et al. | 379/119 |
| 5,751,698 A | * | 5/1998 | Cushman et al. | 370/252 |
| 5,781,529 A | * | 7/1998 | Liang et al. | 370/218 |
| 5,854,899 A | * | 12/1998 | Callon et al. | 395/200.68 |
| 6,108,304 A | * | 8/2000 | Abe et al. | 370/232 |
| 6,275,493 B1 | * | 8/2001 | Morris et al. | 370/395 |
| 6,343,083 B1 | * | 1/2002 | Menelson et al. | 370/466 |

OTHER PUBLICATIONS

"NetExpert® Framework Overview" copyright 1997, Objective Systems Integrators.

* cited by examiner

*Primary Examiner*—Wellington Chin
*Assistant Examiner*—M. Phan
(74) *Attorney, Agent, or Firm*—Fulbright & Jaworski L.L.P.

(57) ABSTRACT

A system and method for managing switched virtual circuits in a virtual circuit switched network. A preferred embodiment method for managing switched virtual circuits comprises determining that a switched virtual circuit has been established in a virtual circuit switched network by a network access device, monitoring the switched virtual circuit while the switched virtual circuit is active, and storing bandwidth and duration information for the switched virtual circuit upon termination of the switched virtual circuit. Another preferred embodiment method comprises receiving a request for establishing the switched virtual circuit from a network access device, generating connection parameters for establishing the switched virtual circuit in the virtual circuit switched network, and sending a reply including the connection parameters to the network access device. A preferred embodiment network management system comprises a network access device gateway having an interface to a network access device in the virtual circuit switched network, a network administrator database connected to the gateway, the database including rules and objects representing characteristics of the virtual circuit switched network, and a rule engine connected to the gateway and having access to the rules and objects in the database. The present invention enables end users to request and use switched virtual circuits and realize the benefits in cost and efficiency over private virtual circuits, and providing service providers with increased bandwidth utilization and improved profitability.

32 Claims, 2 Drawing Sheets

MANAGING SWITCHED VIRTUAL CIRCUITS IN A NETWORK

BACKGROUND

The information/communication industry is currently undergoing tremendous change from the constant evolution of new technologies and changing market conditions. In recent years, there has been a sharp increase in the demand for network bandwidth which has been driven by several trends, including the increasing number of networked computers exchanging data, the increasing need for networked computers to exchange ever-increasing quantities of data, and the increasing demands for data, video and voice over networked connections. In response to this demand, a variety of new computer network technologies have been developed that improve upon existing technologies by increasing the efficiency of data transmission, increasing the speed of data transmission, or both. One network technology incorporating both improvements is virtual circuit technology, such as is used in virtual circuit switched (VCS) networks such as frame relay (FR) or asynchronous transfer mode (ATM) networks.

The prevailing network topology of earlier generations of networks, such as Ethernet, Token Ring, and fiber distributed data interface, is one of a shared physical link. All of such networks' endpoints are attached to the same network segment or link and share a single physical link having a fixed bandwidth. Such networks are generally referred to as broadcast networks because the data transmitted from a single station may be received by all other stations on that link. One disadvantage of broadcast networks is that the addition of more endpoints onto the link reduces the average bandwidth available to each station on that link.

As the demand for network bandwidth increased, new solutions were developed to overcome the shortcomings of shared bandwidth. One technology developed to improve network efficiency is commonly known in the art as switched networking or microsegmentation. Switched networks improve network bandwidth by establishing a dedicated link between an endpoint and a port on a network switch. The network switch generally routes all traffic in such a network by directing the traffic only to the stations that are the traffic's destination. In doing so, no broadcasting occurs as in the shared link approach and the link's full bandwidth is generally always available whenever the switch or endpoint seeks to transmit.

Additional improvements were made to switched networks to further improve bandwidth. VCS networks generally improve upon the switched network model by introducing virtual circuits and intelligent switching. Virtual circuit bandwidth allocation and transfer characteristics, such as delays and delay variations, can be tailored to the application traffic's specific needs. Endpoints can request, through intelligence in the switches and signaling protocols, that the network provide the necessary bandwidth and quality of services needed on each virtual circuit. Primarily as a result of those improvements, VCS networks can simultaneously transport multiple types of network traffic, such as voice, data, and video, on a single physical link using different service types based upon the requirements of the traffic.

The improvements of virtual circuits permit increased bandwidth utilization in a Virtual Circuit Switched network. However this increased bandwidth utilization also increases the complexity of the VCS network. A single physical link can generally be subdivided into virtual paths (VP), which are further subdivided into virtual channels (VC). For example, typical ATM networks generally permit subdivision of a physical link into a maximum of approximately four thousand VPs, and the VPs may be further subdivided into a maximum of approximately sixty-four thousand VCs. Thus, there are potentially in excess of 256 million assignable virtual circuits within each dedicated link.

Prior to the widespread availability of signaling capability in VCS networks, all channel assignments were accomplished by the use of private (or permanent) virtual circuits (PVCs). PVCs are generally configured on a channel-by-channel basis by a manual assignment process occurring at both the switch console and endpoints. Typically, such PVCs are left unchanged, i.e., permanently setup for a specific entity, with a specific bandwidth and cost, until the channel is no longer needed. Because access is provided even when there is no traffic to send, or when less than full capacity is needed, PVCs can be costly and inefficient.

Additional VCS network technology improvements generally permit endpoints to transmit a signal request to the appropriate network device to request that a virtual circuit be set-up, connected, or released as needed. Such virtual circuits are known as switched virtual circuits (SVCs). In a network supporting SVCs, the virtual circuit setup and release requests are generally transmitted in a signaling channel. SVCs generally enable the dynamic utilization of bandwidth customized to each specific request from a network endpoint.

SUMMARY OF THE INVENTION

Although virtual circuit switched networks using SVCs can achieve increased network efficiency, they have generally been used primarily by telecommunications companies in large data hauling pipelines, with minimal direct effect on end users. In other words, end users are generally allowed only to request and pay for PVCs instead of more efficient SVCs. SVCs generally are not in more widespread use, from an end user point of view, because there apparently does not exist an infrastructure capable of properly managing dynamic SVC connections at the appropriate level in a VCS network. Generally, networks must be properly managed to ensure that adequate network performance is achieved and that end-user services are supported. However, the management of a VCS network is made difficult by, for example, the large number of potentially active virtual circuits, the ability for switched virtual circuits to be created and disconnected upon request, and the varying characteristics of each SVC, (such as bandwidth, duration and cost.

Management functions for the monitoring, operation and maintenance of a VCS network may include, for example, performance management (e.g., continuous in-service performance monitoring for pro-active warning of performance degradation), fault management (e.g., detection and location of network trouble and failure), and configuration management (provisioning). Some methods exist for analyzing a virtual connection in a telecommunications network. For example, a method of tracing the route of a virtual connection between two nodes through a telecommunications network is described in U.S. Pat. No. 5,675,578 to Gruber, et al., which patent is incorporated herein by reference. However, there exists a need in the prior art for a method and system to intelligently and dynamically manage switched virtual circuits in a VCS network so that end users can take advantage of the benefits and capabilities of switched virtual circuits.

Accordingly, it is an object of the present invention generally to integrate a network management system (NMS)

with an VCS network to provide real-time switched virtual circuit management.

These and other objects, features and technical advantages generally are achieved by a system and method which manage switched virtual circuits for a virtual circuit switched network. A preferred embodiment method for managing switched virtual circuits in accordance with the present invention comprises determining that a switched virtual circuit has been established in a virtual circuit switched network by a network access device, monitoring the switched virtual circuit while the switched virtual circuit is active, and storing bandwidth and duration information for the switched virtual circuit upon termination of the switched virtual circuit. The method may further comprise reporting the bandwidth and duration information to the network access device after termination of the switched virtual circuit.

Another preferred embodiment method for managing switched virtual circuits in accordance with the present invention comprises receiving a request for establishing the switched virtual circuit from a network access device, generating connection parameters for establishing the switched virtual circuit in the virtual circuit switched network, and sending a reply including the connection parameters to the network access device. The generation of the connection parameters may comprise rules-based decision making using rules and objects representing characteristics of the virtual circuit network stored in a network administrator relational database. The reply may comprise provisioning information on establishing the switched virtual circuit in the virtual circuit switched network.

A preferred embodiment network management system in accordance with the present invention comprises a network access device gateway having an interface to a network access device in the virtual circuit switched network, a network administrator database connected to the gateway, the database including rules and objects representing characteristics of the virtual circuit switched network, and a rule engine connected to the gateway and having access to the rules and objects in the database. The rule engine is capable of generating switched virtual circuit connection parameters reply based upon the rules and objects, in response to a switched virtual circuit provisioning request received from the network access device via the gateway.

A preferred embodiment computer program product for managing a switched virtual circuit in a virtual circuit switched network in accordance with the present invention comprises a computer readable medium and a computer program stored on the computer-readable storage medium. The computer program comprises means for receiving a request for establishing the switched virtual circuit from a network access device, means for generating connection parameters for establishing the switched virtual circuit in the virtual circuit switched network, and means for sending a reply including the connection parameters to the network access device.

An advantage of the present invention is that it generally integrates a network management system (NMS) with an SVC network to provide real-time switched virtual circuit management, thus enabling end users to request and use switched virtual circuits and realize the benefits in cost and efficiency over private virtual circuits, and providing service providers (SPs) with increased bandwidth utilization and improved profitability.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
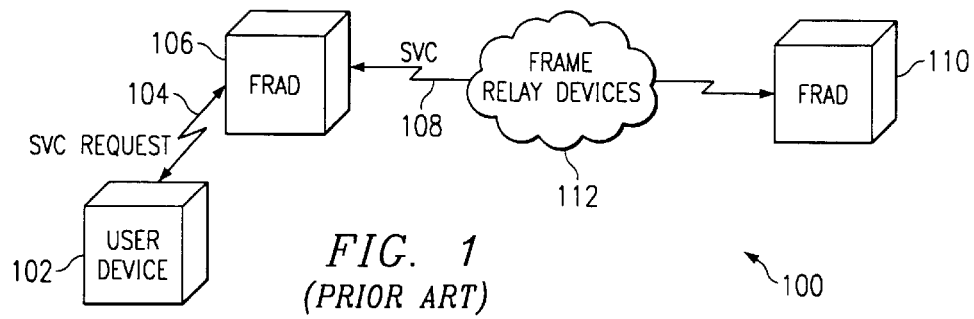
FIG. 1 is a block diagram of a prior art frame relay network.

FIG. 1 is a high level block diagram of prior art frame relay network 100. In FR network 100, user device 102 issues switched virtual circuit request 104 to frame relay access device (FRAD) 106. In response to this request, FRAD 106 in theory establishes switched virtual circuit 108 to FRAD 110 via other FR devices 112 which are in FR network 100.

However, prior art FR network 100 does not provide sufficient network management for the proper establishment, monitoring, termination and reporting required for SVC 108 to be practically used by end user 102. In other words, FR network 100 generally is designed to implement switched virtual circuits, but this has not been done on an end user level in the prior art because of insufficient network management control and monitoring, which is needed, for example, for proper billing of the end user. With prior art systems, provisioning, monitoring and reporting of switched virtual circuits in an SVC network based on customer Service Level Agreements (SLAs), pricing policies, usage requirements, and duration and bandwidth of the connection therefore have not been practical.

Figure 2:
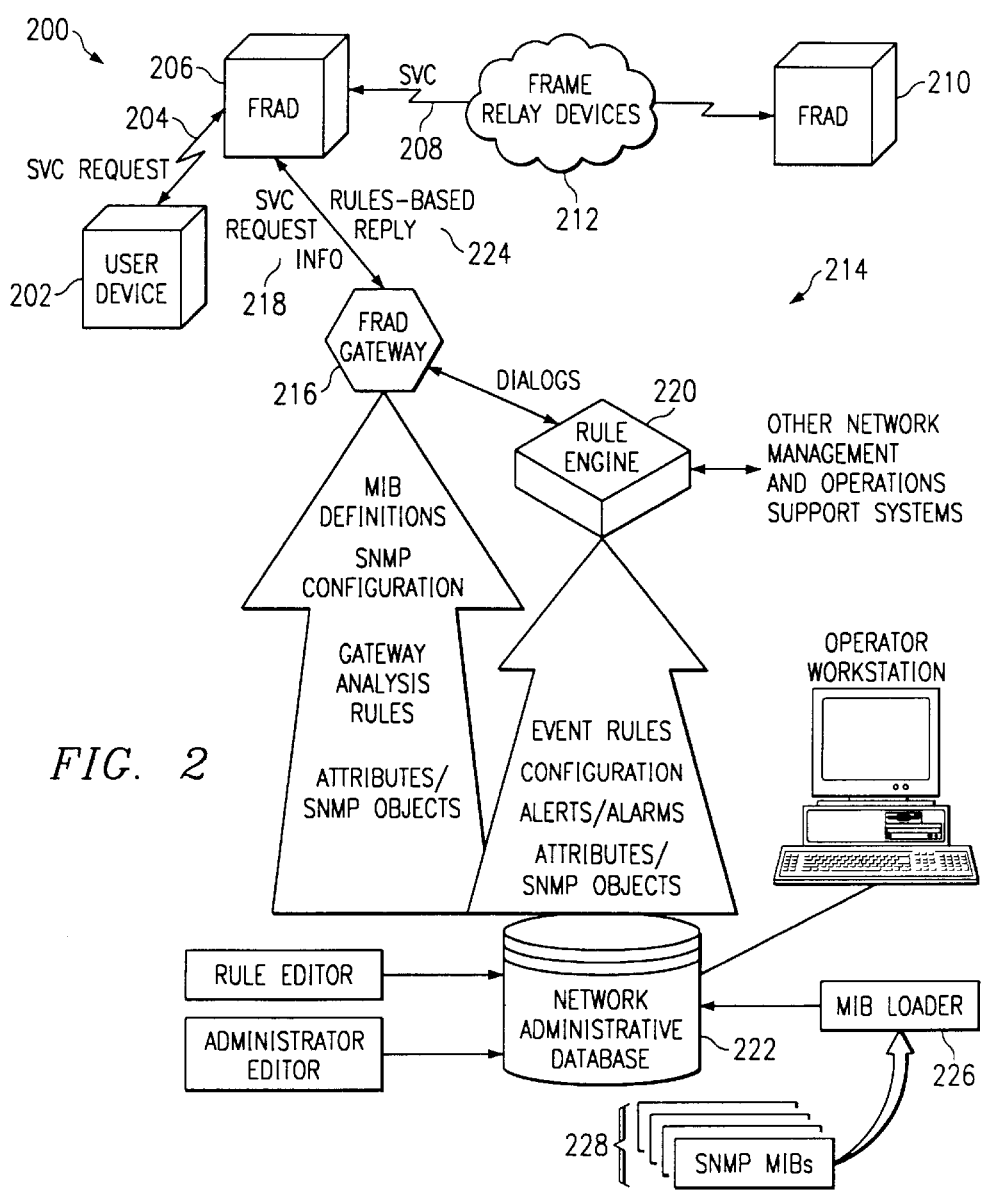
FIG. 2 is a block diagram of a network management system integrated into a frame relay network.

With reference now to FIG. 2, there is shown a switched virtual circuit network management system in accordance with a preferred embodiment of the present invention. In particular, NetExpert® NMS 214, a product of Objective Systems Integrators, Inc. (OSI), is shown connected to frame relay network 200. NMS 214 provides for the provisioning, monitoring and reporting of switched virtual circuits in frame relay network 200. NetExpert is an object-oriented NMS comprising a set of integrated software modules and graphical user interface (GUI) development tools that permit the creation and deployment of network management and operations support solutions, and is more fully described in a 1997 OSI brochure entitled NetExpert Framework Overview. The NetExpert framework provides a platform for the creation of an NMS for nearly any complex WAN. Each element, device and even database may be managed as a separate object. Each element, device and other managed object requires a separate set of rules to be tailored to the nature of the object, its specific hardware and software, and the business practices of the company. Each rule set provides the details for the management of the particular object to which the rules are directed. NetExpert's editors permit this customization to be performed by subject matter experts who use their knowledge to create simple sets of rules such as "if-then" statements to manage their NMS, rather than requiring skilled programmers to integrate devices and other elements with additional computer software code such as C and/or C++. NetExpert has been used to manage a variety of communications and computer devices, from switches and routers to automated teller machines. However, an NMS has not been used in the prior art to provide provisioning, monitoring and reporting for switched virtual circuits in a VCS network.

It should be noted that while the invention generally is described in the context of a frame relay network, it is equally applicable to any telecommunications network such as Asynchronous Transfer Mode (ATM), Switched Multi-Megabit Digital Service (SMDS), or other packet based networks which implement switched virtual circuits. In addition, while this invention is applicable to an NMS in general, it will be described in reference to OSI's NetExpert system to provide a concrete example of an NMS application.

Generally, NetExpert uses rules-based software to facilitate, manage and optimize the employment of such a system. In FIG. 2, when network access device FRAD 206 receives SVC request 204 from user device 202, FRAD 206 passes SVC request information 218 on to NMS 214. FRAD gateway 216 receives the request and passes it on to rule engine 220. Based on rule sets maintained in relational network administrator database 222, rule engine 220 evaluates the SVC request in light of service level agreements, available residual bandwidth on the backbone and bandwidth requested, and SVC allocation for the duration of the connection. Rules-based reply 224 is then sent by FRAD gateway 216 to FRAD 206, which then establishes SVC 208 to FRAD 210 via other FR network devices 212. Once a connection is established, NMS 214 monitors the packet traffic for faults, reroutes traffic if necessary, and tracks bandwidth allocated and duration for use in customer billing. Assessment of total bandwidth utilization and recommendations for increases or decreases in total capacity may also be made based on specific rule sets.

Generally, with NMS 214 connected to FR network 200, the system may provision customers, establish SLAs, monitor service requests, and allocate and establish appropriate FR SVCs. During SVC operation, the system may track usage, service levels, bandwidth and costs. After tear down of the FR SVC on completion, the system may log usage, SVC bandwidth utilization, duration and customer use and billing information, and archive and report the information to service providers, managers and customers. By managing the entire process from customer account and SLA establishment, frame relay SVC set up, bandwidth- and SLA-based rule set decision making, and usage information accumulation and reporting, NMS 214 generally provides complete administrative control to the service provider for managing SVCs in a VCS network.

Alternatively, NMS 214 may be enhanced, for example, with NetExpert's management information base (MIB) monitoring/management, SS7 communications protocol and/or Simple Network Management Protocol (SNMP) as appropriate for a particular application. SNMP MIBs 228 and MIB loader 226 are shown providing information to network administrator database 222 in FIG. 2.

Figure 3:
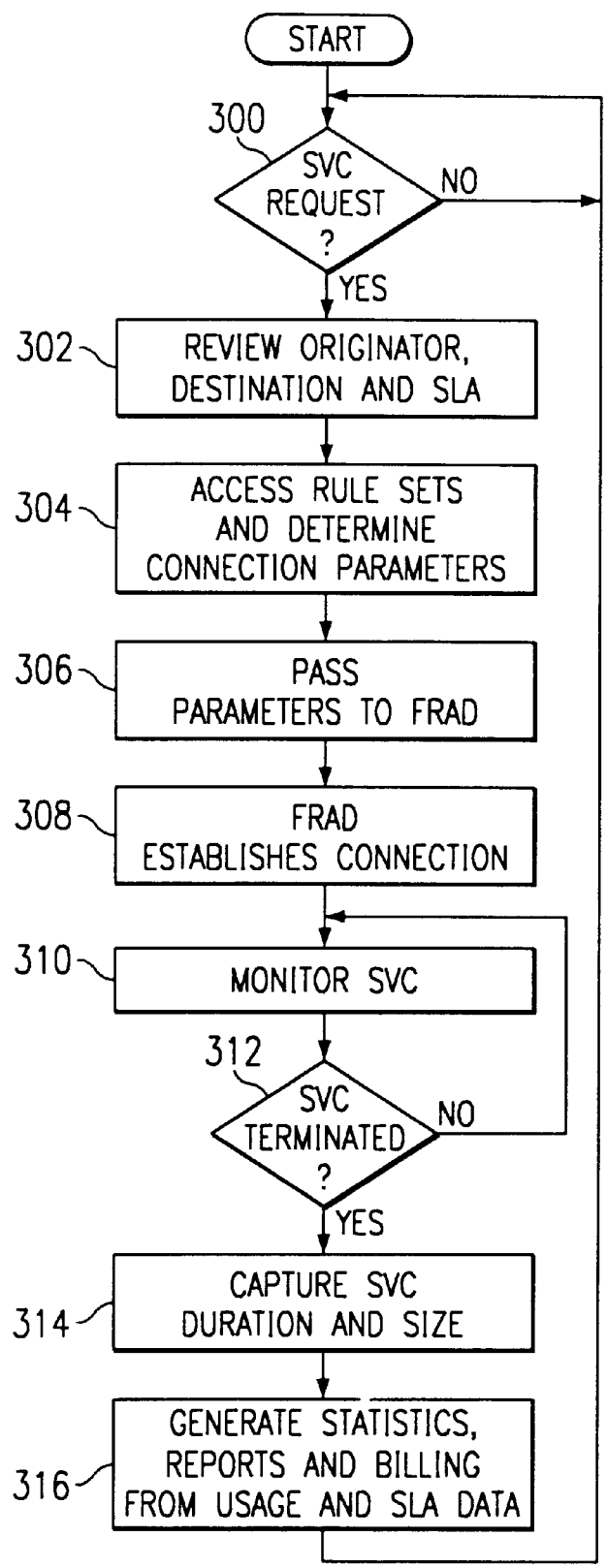
FIG. 3 is a flow chart depicting the functioning of a network management system integrated into a frame relay network.

With reference now to FIG. 3, there is shown a flow chart depicting the operation of NMS 214 for a complete SVC request-establishment-termination-report cycle. Before being used to manage FR network 200 (in FIG. 2), NMS 214 generally must be taught the characteristics of FR network 200 in order to properly make decisions about or monitor SVC connections. Initial preparation includes SLA specifications about permissible pipe sizes, billing rates, and restrictions on duration if they exist, etc. Once all of the generic and application specific network information has been stored as objects and rules in network administrator database 222, NMS 214 may then provide rules-based decision making for FR network 200.

In step 300 of FIG. 3, NMS 214 waits for SVC request information 218. Receiving SVC request information 218 indicates that a service provider's customer has issued switched virtual circuit request 204 to FRAD 206 for FR service between user device 202 and a destination endpoint. FRAD 206 in turn passed SVC request information 218 to NMS 214. In step 302, NMS 214 then reviews the originator, destination and customer SLA. In step 304, NMS 214 uses rule engine 220 to process the request against a NetExpert rule set maintained in database 222 based on information reviewed in step 302, and on bandwidth requested and available managed residual bandwidth, to determine connection parameters for establishing the SVC. In step 306, rules-based reply 224 containing connection parameters for the appropriately sized SVC is sent by FRAD gateway 216 to FRAD 206. FRAD 206 then establishes SVC 208 to FRAD 210 via other FR network devices 212. Once a connection is established, NMS 214 monitors the connection and tracks usage, origin and destination IDs, bandwidth, and circuit duration, in step 310, and waits for the SVC to be terminated in step 312. After SVC 208 is no longer needed and is closed out by FRAD 206, NMS 214 tracks the circuit closure, usage rate, bandwidth and duration, and updates the managed data in step 314. Finally, in step 316, NMS generates statistics, reports and billing information for the customer and the SP as appropriate on the usage, billing charges, utilization, total circuit sizing, the deltas between requested and allocated bandwidth, the requested and available bandwidth, and the residual bandwidth.

In general, NMS 214 may perform the complete functionality described, or it may perform only selected functions. For example, while NMS 214 has been discussed as directing the establishment, provisioning, and sizing of SVCs, FRAD 206 may establish SVCs on its own, and NMS 214 may only be used for tracking SVCs to monitor bandwidth allocated, and provide the billing information as necessary. Likewise, not all steps in FIG. 3 must be performed by NMS 214, nor must all steps be performed in the specific order shown. For example, FRAD 206 may perform the SVC provisioning and establishment step, with NMS 214 performing monitoring functions only. FRAD gateway 216 may be considered part of NMS 214 in some applications, and it may be considered as part of FR network 200 in others. All of the above variations are considered to be within the scope of the present invention.

It should be noted that many current network management systems generally have some scalability limits which might inhibit them from managing the maximum theoretical number of SVC connections possible in a virtual circuit switched network. Practically, however, the number of connections required to be managed is generally much lower than the theoretical amount because the number is limited by the actual number of SVC provisioning requests that occur at any given time. In any case, even if scalability limits are approached for a particular network management system for a particular virtual circuit switched network, configuration of the overall system may be accomplished in such a way as to accommodate the scalability requirements of the network. For example, multiple installations of network management systems may be daisy-chained together to increase the scalability limit of the overall system. Alternatively, multiple instances of a network management system may be implemented to split up the network requirements between the multiple network management systems. The division may be done, for example, by customer last name, or by any other method which divides up the connection management load between the systems.

Although the present invention and its advantages have been described in detail, it should be understood that various changes, substitutions and alterations can be made herein without departing from the spirit and scope of the invention as defined by the appended claims.

What is claimed is:

1. A method for managing a switched virtual circuit in a virtual circuit switched network, said method comprising:
   determining that said switched virtual circuit has been established in said network by a network access device;
   monitoring said switched virtual circuit while said switched virtual circuit is active; and
   storing bandwidth and duration information for said switched virtual circuit upon termination of said switched virtual circuit.

2. The method of claim 1, wherein said determining that said switched virtual circuit has been established comprises receiving a message from said network access device.

3. The method of claim 1, wherein said monitoring of said switched virtual circuit comprises tracking allocated bandwidth and duration of said switched virtual circuit.

4. The method of claim 1, wherein said monitoring of said switched virtual circuit comprises tracking utilized bandwidth of said switched virtual circuit.

5. The method of claim 1, wherein said monitoring of said switched virtual circuit comprises fault monitoring.

6. The method of claim 5, wherein said network management system comprises rules stored to a database, and wherein upon occurrence of a fault, said network management system determines an action to be taken in response to said fault based at least in part on said rules.

7. The method of claim 6, wherein said action includes said network management system requesting said network access device reroute said switched virtual circuit.

8. The method of claim 1, wherein said storing of said bandwidth and duration information comprises saving said information in a network administrator relational database.

9. The method of claim 1 further comprising reporting said bandwidth and duration information to said network access device after termination of said switched virtual circuit.

10. The method of claim 9, wherein said reporting further comprises sending customer usage and billing information to said network access device.

11. The method of claim 1, wherein said virtual circuit switched network is a frame relay network, and said network access device is a frame relay access device.

12. A computer program product including computer readable logic recorded thereon for managing a switched virtual circuit in a virtual circuit switched network, the computer program product comprising:
   a computer readable medium; and
   a computer program stored on the computer-readable medium, the computer program comprising
   means for determining that said switched virtual circuit has been established in said network by said network access device,
   means for monitoring said switched virtual circuit while said switched virtual circuit is active, and
   means for storing duration and bandwidth information for said switched virtual circuit upon termination of said switched virtual circuit.

13. The computer program product of claim 12, said computer program further comprising means for reporting said bandwidth and duration information to said network access device after termination of said switched virtual circuit.

14. The computer program product of claim 13, wherein said means for reporting further comprises sending customer usage and billing information to said network access device.

15. The computer program product of claim 12, further comprising:
   means for receiving a request for establishing said switched virtual circuit from said network access device;
   means for generating connection parameters for establishing said switched virtual circuit in said virtual circuit switched network; and
   means for sending a reply including said connection parameters to said network access device.

16. The computer program product of claim 15, wherein said reply comprises provisioning information on establishing said switched virtual circuit in said virtual circuit switched network.

17. A method for managing a switched virtual circuit in a virtual circuit switched network, said method comprising:
   receiving at a management system a request from a network access device for establishing said switched virtual circuit;
   said management system generating connection parameters for establishing said switched virtual circuit in said virtual circuit switched network;
   said management system communicating said connection parameters to said network access device;
   said network access device establishing said switched virtual circuit; and
   said management system storing usage information for said switched virtual circuit upon termination of said switched virtual circuit.

18. The method of claim 17 further comprising:
   upon said network access device establishing said switched virtual circuit, said management system receiving a message from said network access device indicating that said switched virtual circuit has been established.

19. The method of claim 17 further comprising:
   said management system monitoring said switched virtual circuit while it is active.

20. The method of claim 19 wherein said monitoring of said switched virtual circuit comprises tracking allocated bandwidth and duration of said switched virtual circuit.

21. The method of claim 19, wherein said monitoring of said switched virtual circuit comprises tracking utilized bandwidth of said switched virtual circuit.

22. The method of claim 19 wherein said monitoring of said switched virtual circuit comprises fault monitoring.

23. The method of claim 22, wherein said management system comprises rules stored to a database, and wherein upon occurrence of a fault, said management system determines an action to be taken in response to said fault based at least in part on said rules.

24. The method of claim 23 wherein said action includes said management system requesting said network access device reroute said switched virtual circuit.

25. The method of claim 17 wherein said usage information comprises bandwidth and duration information.

26. The method of claim 17 further comprising:

said management system reporting said usage information to said network access device after termination of said switched virtual circuit.

27. The method of claim 17 wherein said virtual circuit switched network is a frame relay network, and said network access device is a frame relay access device.

28. A network management system for a virtual circuit switched network, said system comprising:

a gateway having an interface to a network access device in said virtual circuit switched network;

a rule engine communicatively coupled to said gateway and operable to generate switched virtual circuit connection parameters in response to a switched virtual circuit provisioning request received from said network access device via said gateway; and logic for storing usage information for a switched virtual circuit upon termination of said switched virtual circuit.

29. The network management system of claim 28 wherein said gateway is operable to communicate the generated switched virtual circuit connection parameters to said network access device.

30. The network management system of claim 29 wherein said network access device operable to use said generated switched virtual circuit connection parameters to establish said switched virtual circuit.

31. The network management system of claim 28 wherein said usage information comprises bandwidth and duration information.

32. The network management system of claim 28 wherein said virtual circuit switched network is a frame relay network, and said network access device is a frame relay access device.

* * * * *